United States Patent
Eckman et al.

(10) Patent No.: US 9,007,572 B2
(45) Date of Patent: Apr. 14, 2015

(54) MULTIFUNCTION SOLID-STATE INSPECTION SYSTEM

(71) Applicant: PROMET International, Inc., Shoreview, MN (US)

(72) Inventors: Ryan Elliot Eckman, Columbus, MN (US); Peter David Koudelka, St. Paul, MN (US); Lubomir Koudelka, Shoreview, MN (US)

(73) Assignee: Promet International, Inc., Shoreview, MN (US)

( * ) Notice: Subject to any disclaimer, the term of this patent is extended or adjusted under 35 U.S.C. 154(b) by 90 days.

(21) Appl. No.: 13/800,539

(22) Filed: Mar. 13, 2013

(65) Prior Publication Data

US 2014/0268109 A1    Sep. 18, 2014

(51) Int. Cl.
| | | |
|---|---|---|
| *G01N 21/00* | (2006.01) | |
| *G01B 9/02* | (2006.01) | |
| *G01M 11/00* | (2006.01) | |
| *G02B 21/00* | (2006.01) | |

(52) U.S. Cl.
CPC ............. *G01B 9/0203* (2013.01); *G01M 11/30* (2013.01); *G02B 21/0016* (2013.01)

(58) Field of Classification Search
CPC .................... G01J 2003/069; G01J 2003/0269
USPC ............... 359/370–371; 356/237.1, 512, 511, 356/492; 382/145
See application file for complete search history.

(56) References Cited

U.S. PATENT DOCUMENTS

| | | | |
|---|---|---|---|
| 3,028,782 A | | 4/1962 | Bernhardt et al. |
| 3,630,610 A | * | 12/1971 | Klein ............................... 355/71 |
| 4,310,245 A | * | 1/1982 | Pritchard ...................... 356/497 |
| 5,004,205 A | | 4/1991 | Brown et al. |
| 5,179,419 A | | 1/1993 | Palmquist et al. |
| 5,459,564 A | | 10/1995 | Chivers |
| 5,535,002 A | | 7/1996 | Csipkes et al. |
| 5,543,915 A | | 8/1996 | Csipkes et al. |
| 5,568,315 A | * | 10/1996 | Shuman .................... 359/485.03 |
| 5,600,439 A | | 2/1997 | Csipkes et al. |
| 5,636,020 A | | 6/1997 | Csipkes et al. |
| 5,706,085 A | * | 1/1998 | Blossey et al. ................. 356/512 |
| 5,847,828 A | * | 12/1998 | Downs .......................... 356/451 |
| 5,862,250 A | | 1/1999 | Csipkes et al. |
| 5,898,494 A | | 4/1999 | Csipkes |
| 5,917,595 A | | 6/1999 | Norland et al. |
| 5,973,784 A | | 10/1999 | Szwaykowski et al. |

(Continued)

OTHER PUBLICATIONS

Nikon MicroscopyU, Principles and Applications of Two=Beam Interferometry, http://www.microscopyu.com/articles/interferometry/twobeam.html, 9 pages, at least as early as May 2011.

*Primary Examiner* — Kara E Geisel
*Assistant Examiner* — Maurice Smith
(74) *Attorney, Agent, or Firm* — Leanne Taveggia Farrell; Westman, Champlin & Koehler, P.A.

(57) ABSTRACT

An inspection system includes optical components for operating the inspection system in an interference fringe imaging mode and a microscope imaging mode. The inspection system further includes at least one optical light source configured to emit a first wavelength of light to operate the inspection system in the interference fringe imaging mode and configure to emit a second wavelength of light to operate the inspection system in the microscope mode. The first wavelength of light is different from the second wavelength of light.

20 Claims, 5 Drawing Sheets

(56) References Cited

U.S. PATENT DOCUMENTS

| | | |
|---|---|---|
| 6,052,505 A | 4/2000 | Bice et al. |
| 6,172,349 B1 * | 1/2001 | Katz et al. ............... 250/201.3 |
| 6,215,555 B1 | 4/2001 | Chivers |
| 6,466,310 B2 | 10/2002 | Nguyen et al. |
| 6,480,285 B1 * | 11/2002 | Hill ............................ 356/492 |
| 6,705,767 B1 | 3/2004 | Dean, Jr. et al. |
| 6,736,702 B2 | 5/2004 | Minami |
| 6,786,650 B2 | 9/2004 | Dean, Jr. et al. |
| 6,831,738 B2 | 12/2004 | Rogers et al. |
| 6,947,149 B2 | 9/2005 | Kobayashi et al. |
| 6,954,274 B2 | 10/2005 | Sasaki et al. |
| 7,312,859 B2 | 12/2007 | Koudelka et al. |
| 7,667,831 B2 | 2/2010 | Koudelka et al. |
| 2002/0109831 A1 | 8/2002 | Van Nguyen et al. |
| 2002/0131754 A1 | 9/2002 | Kaiser et al. |
| 2003/0048435 A1 | 3/2003 | Nguyen et al. |
| 2003/0053043 A1 | 3/2003 | Nguyen et al. |
| 2003/0128939 A1 | 7/2003 | Nguyen et al. |
| 2006/0072118 A1 * | 4/2006 | Chan et al. .................... 356/495 |
| 2011/0317168 A1 * | 12/2011 | Shiran .......................... 356/496 |

* cited by examiner

MULTIFUNCTION SOLID-STATE INSPECTION SYSTEM

BACKGROUND

To join two fibers or fiber optic connectors together, the quality of a fiber endface or fiber connector endface needs to meet certain standards to maximize coupling efficiency and ensure proper operation of the fiber or fiber connector. Generally, a fiber endface or fiber connector endface has a desirable geometry or topography as well as an acceptable surface quality. A desirable surface geometry and acceptable surface quality is usually achieved through an optical polishing process and tested by one or more optical instruments to verify that the endface meets certain standards.

Different optical instruments have been employed to inspect the endface of a fiber or fiber connector. Examples include optical microscopes, interferometers or combinations thereof. While optical microscopes magnify undesirable surface defects, interferometers utilize principles of optical interference to generate a fringe pattern representing the surface profile being inspected. Interferometers inspect and qualify the endfaces of fiber optic connectors to critically measure endface geometry including radius of curvature, apex offset and fiber protrusion or recession.

The discussion above is merely provided for general background information and is not intended to be used as an aid in determining the scope of the claimed subject matter.

SUMMARY

An inspection system includes optical components for operating the inspection system in an interference fringe imaging mode and a microscope imaging mode. The inspection system further includes at least one optical light source configured to emit a first wavelength of light to operate the inspection system in the interference fringe imaging mode and configured to emit a second wavelength of light to operate the inspection system in the microscope mode. The first wavelength of light is different from the second wavelength of light.

The inspection system further includes a beam splitter including a beam splitter surface that splits the first wavelength of light into a test beam and a reference beam at the beam splitter surface and splits the second wavelength of light into a test beam and a reference beam at the beam splitter surface. The test beam of the first wavelength of light is directed in a first direction along a test path to a test specimen and the reference beam of the first wavelength of light is directed in a second direction along a reference path to a reference surface. The test beam of the second wavelength of light is directed in the first direction along the test path to the test specimen and the reference beam of the second wavelength of light is directed along the reference path in the second direction. The first direction is different from the second direction. A wavelength-specific light absorbing filter intersects the reference path and is interposed between the beam splitter and the reference surface. The wavelength-specific light absorbing filter absorbs the reference beam of the second wavelength of light, but allows the reference beam of the first wavelength to pass to the reference surface.

This Summary is provided to introduce a selection of concepts in a simplified form that are further described below in the Detailed Description. This Summary is not intended to identify key features of the claimed subject matter, nor is it intended to be used as an aid in determining the scope of the claimed subject matter. The claimed subject matter is not limited to implementations that solve any or all disadvantages noted in the background.

DETAILED DESCRIPTION

The multifunction inspection system includes solid-state optical components for operating in an interference fringe imaging mode and microscope imaging mode to determine geometry, topography and surface quality of a test specimen, such as a fiber endface, a fiber connector endface or other type of microscopic optical surface, such as a lens array or other suitable surface. Rather than utilizing movable parts or electronic mechanisms that can wear out over time, such as shutters, adjustment knobs, and the like, to switch between the interference mode and the microscope mode, at least one optical light source emits a first wavelength of light to operate the inspection system in the interference mode and emits a second wavelength of light to operate the inspection system in the microscope mode.

A Michelson-based interferometer is an optical device configuration used for producing an interference fringe image (for acquiring 3D surface information) in optical interferometry. A fringe image or pattern is generated by splitting a beam of light from a light source (i.e. via an illumination path) into two beams along two different beam paths by a beam splitter (i.e., half minor). One beam is directed onto a reference mirror (i.e., via the reference path) and the other onto the test specimen (i.e., via the test path). The beams reflect from the reference mirror and the specimen and are made to interfere to form a two-beam interference fringe pattern that is viewed and/or captured by an image sensor (i.e. via an imaging path). The image sensor may be monochrome or use colored pixels such as a red-green-blue (RGB) array.

For the surface of a test specimen to be imaged without interference fringes (i.e., for 2D surface inspection microscope imaging), the beam traveling to the reference minor must be altered or blocked using movable parts. In practice the reference beam is typically blocked by placing an object between the beam splitter plate or cube and the reference surface.

Figure 1:
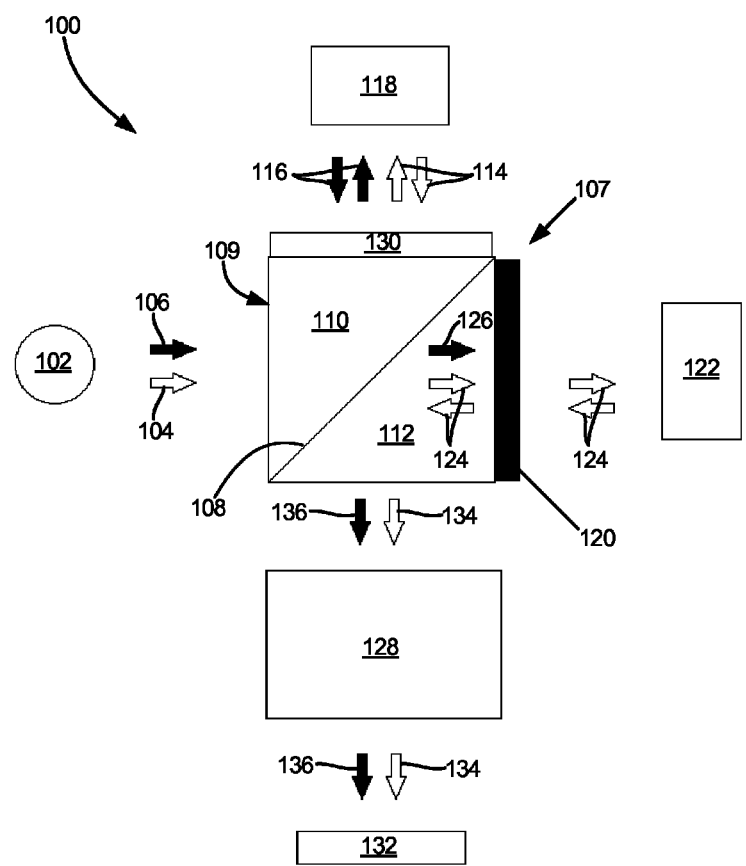
FIG. 1 illustrates a schematic diagram of an inspection system according to one embodiment.

FIG. 1 illustrates a schematic diagram of an inspection system 100 according to one embodiment. Inspection system 100 includes at least one optical light source 102, a beam splitter assembly 107 having a beam splitter 109, a wavelength-specific or color-specific light absorbing filter 120, a reference surface 122, imaging optics 128 and an image sensor 132.

At least one optical light source 102 emits or illuminates at least a first source light beam 104 having a first wavelength of light and a second source light beam 106 having a second wavelength of light along an illumination or source path or illumination or source arm. The first wavelength of light is different from the second wavelength of light and can be emitted or illuminated in concurrence or emitted or illuminated asynchronously. In one embodiment, the at least one optical light source 102 includes a multiple wavelength light source. In another embodiment, the at least one optical light source 102 includes a plurality of laser or light emitting diodes that combine to emit first source light beam 104 and second source light beam 106. For example, the at least one optical light source can include one or more true white lights (e.g., incandescent or filament light or light emitting diodes). In another example, the at least one optical light source 102 can include a plurality of differently colored or different wavelengths of light sources (e.g., red, green and blue light emitting diodes arrange on a common die) that combine to simulate or approximate a white light. In FIG. 1, first and second source light beams 104 and 106 are drawn separately for clarity; however, first and second source light beams may be emitted as a single beam having a first wavelength of light 104 and a different second wavelength of light 106.

In FIG. 1, beam splitter assembly 107 comprises a beam splitter cube 109 including a beam splitter surface or half mirror 108 and first and second prisms 110 and 112, which are typically made of glass. First and second prisms 110 and 112 are right angle prisms that are assembled together or coupled together at their hypotenuse surfaces to form the beam splitter surface 108. Source light beam 104 that has a first wavelength of light enters beam splitter 109 and splits at beam splitter surface 108 into a test beam 114 and a reference beam 124. Test beam 114 passes through or is directed through right angle prism 110, travels in a first direction (indicated by the arrow in test beam 114) along a test path or test arm and reflects off a test surface 118. Test surface 118 is a surface of an optical test specimen, such as an endface of a fiber or fiber connector. Reference beam 124 passes through or is directed through right angle prism 112, travels in a second direction (indicated by the arrow in reference beam 124) along a reference path or reference arm that is different from the first direction and reflects off reference surface 122. In one embodiment, reference surface 122 is a reference mirror that provides phase shifting capability on reference beam 124 for high-resolution three-dimensional surface geometry measurements. For example, a piezoelectric element can induce a phase shift in reference beam 124 by moving reference surface 122.

Wavelength-specific or color-specific light absorbing filter 120 is interposed between beam splitter 109 and reference surface 122 and intersects the reference path or reference arm. In one embodiment and as illustrated in FIG. 1, wavelength-specific light absorbing filter 120 can be part of beam splitter assembly 107 by being adhered to a face of beam splitter 109 (or a leg of right angled prism 112) using, for example, an optical compliant adhesive. In FIG. 1, reference beam 124 not only passes through right angle prism 112, but also passes through wavelength-specific light absorbing filter 120. In other words, wavelength-specific light absorbing filter 120 is transparent to the first wavelength of light and is matched in optical path length (OPL) at the first wavelength of light.

Test beam 114 and reference beam 124 interfere or recombine at beam splitter surface 108 to become interference fringe mode beam 134. Interference fringe mode beam 134 passes through imaging optics 128 and is focused onto image sensor 132 to produce an interference image. In other words, interference fringe mode beam 134 is imaged by imaging optics 128 onto image sensor 132 for image capture and viewing. Imaging optics 128 can include a plurality of lenses. After imaging optics 128 image interference fringe mode beam 134, image sensor 132 creates an intensity profile of each fringe pattern for digitizing and conversion to an interference image. Therefore, the first wavelength of light is used to operate inspection system 100 in an interference fringe imaging mode.

Source light beam 106 that has a second wavelength of light enters beam splitter 109 and splits at beam splitter surface 108 into a test beam 116 and a reference beam 126. Test beam 116 passes through or is directed through right angle prism 110, travels in the first direction (indicated by the arrow in test beam 116) along the test path or test arm and reflects off test surface 118. Reference beam 126 passes through or is directed through right angle prism 112 in the second direction (indicated by the arrow in reference beam 126), but is absorbed by wavelength-specific or color specific light absorbing filter 120. In other words, wavelength-specific light absorbing filter 120 is matched to the second wavelength of light so that it absorbs the second wavelength of light and prevents reference beam 126 from reaching reference surface 122.

Test beam 116 is transmitted through beam splitter 109 and becomes microscope imaging mode beam 136. Microscope imaging mode beam 136 passes through imaging optics 128 and is focused onto image sensor 132 to produce a microscope image. In other words, microscope mode beam 136 is imaged by imaging optics 128 onto image sensor 132 for image capture and viewing.

Inspection system 100 further includes an optical path length (OPL) compensation plate 130 interposed between beam splitter 109 and test surface 118. Inspection systems with finite bandwidth or short coherence length optical light sources, such as LEDs, need to ensure that each path or arm is balanced with equal amounts of glass to maximize fringe visibility. To accomplish this in FIG. 1, beam splitter assembly 107 includes two right angled prisms 110 and 112, which have substantially equal optical path length, wavelength-specific or color specific light absorbing filter 120 adhered to a leg of prism 112 and OPL compensation plate 130 intersecting the test path and adhered to a leg of prism 110 to achieve balanced or substantially equal optical path lengths between the test path or test arm and the reference path or reference arm within the order of the first wavelength of light, or, well within the coherence length of the finite bandwidth light source.

As previously described, the first and second wavelengths can be emitted or illuminated in concurrence (i.e., switched-on at the same time using one or more light sources) or can be emitted or illuminated asynchronously (i.e., switched-on using different light sources). In the embodiment where the first and second wavelengths are emitted or illuminated in concurrence, image sensor 132 includes a spectrally filtered digital image capturing device, such as an RGB color image sensor array. For example, when the first wavelength of light is red and the second wavelength of light is blue, both the first and second wavelengths of light can be emitted or illuminated in concurrence and, therefore, both the interference fringe imaging mode and the microscope imaging mode can be viewed in one exposure by separating the raw RGB pixel color data. The RGB color image sensor array can also be programmed to acquire continuously streamed video for both modes simultaneously. In the embodiment where the first and second wavelengths are emitted or illuminated asynchronously, image sensor 132 can include a variety of different types of capturing devices including a monochrome image sensor array or an RGB color image sensor array because images from the interference fringe imaging mode will be captured separately from images from the microscope imaging mode.

Figure 2:
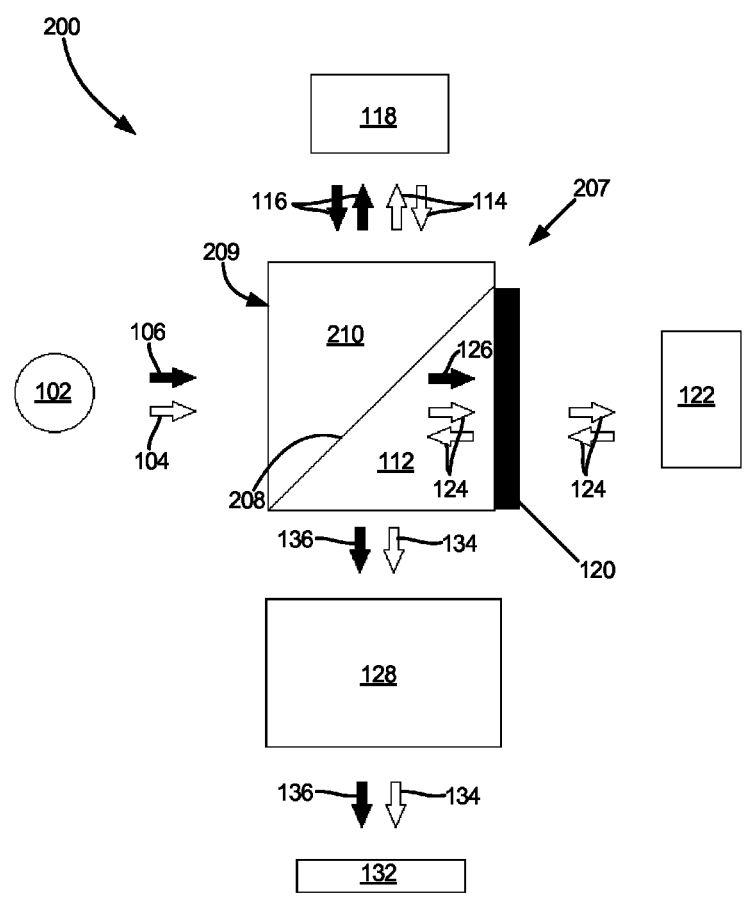
FIG. 2 illustrates a schematic diagram of an inspection system according to another embodiment.

FIG. 2 illustrates a schematic diagram of an inspection system 200 according to another embodiment. Inspection system 200 is similar to inspection system 100 except inspection system 200 includes beam splitter assembly 207 having a beam splitter cube 209 and no OPL compensation plate. While beam splitter cube 209 still includes right angled prism 112, beam splitter cube 209 includes one larger prism 210 to achieve balanced or substantially equal optical path lengths between the test path or test arm and the reference path or reference arm within the order of the first wavelength of light, or, well within the coherence length of the finite bandwidth light source.

Figure 3:
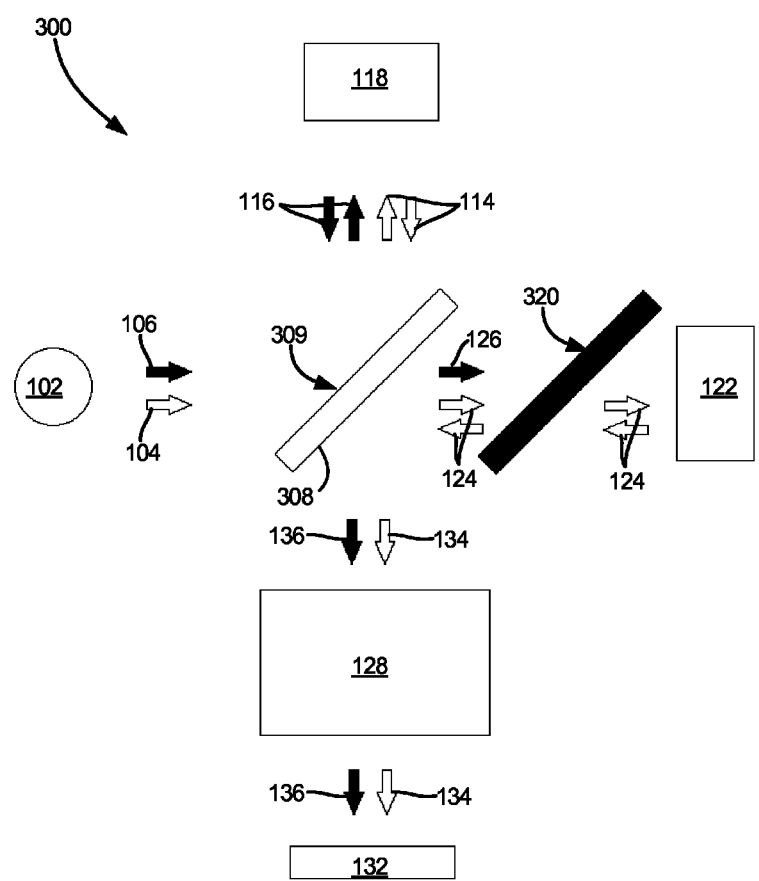
FIG. 3 illustrates a schematic diagram of an inspection system according to yet another embodiment.

FIG. 3 illustrates a schematic diagram of an inspection system 300 according to yet another embodiment. Inspection system 300 is similar to inspection system 200 except inspection system 200 includes a beam splitter plate 309 and first source beam 104 having the first wavelength of light and second source beam 106 having the second wavelength of light are split at beam splitter surface 308 of beam splitter plate 309. As illustrated, beam splitter surface 308 is located on an outer surface of beam splitter plate 309.

In addition, inspection system 300 includes a wavelength-specific light absorbing plate 320 that is located a spaced distance from beam splitter plate 309 and a spaced distance from reference surface 122. Further, wavelength-specific light absorbing plate 320 is tilted at an angle to match an angle to which beam splitter plate 309 is tilted. As illustrated in FIG. 3, beam splitter plate and wavelength-specific light absorbing plate 320 are tilted at a 45 degree angle. However, it should be understood that other angles can be employed. In this configuration, no additional OPL compensation plate is needed to achieve balanced or substantially equal optical path lengths between the test path or test arm and the reference path or reference arm.

Figure 4:
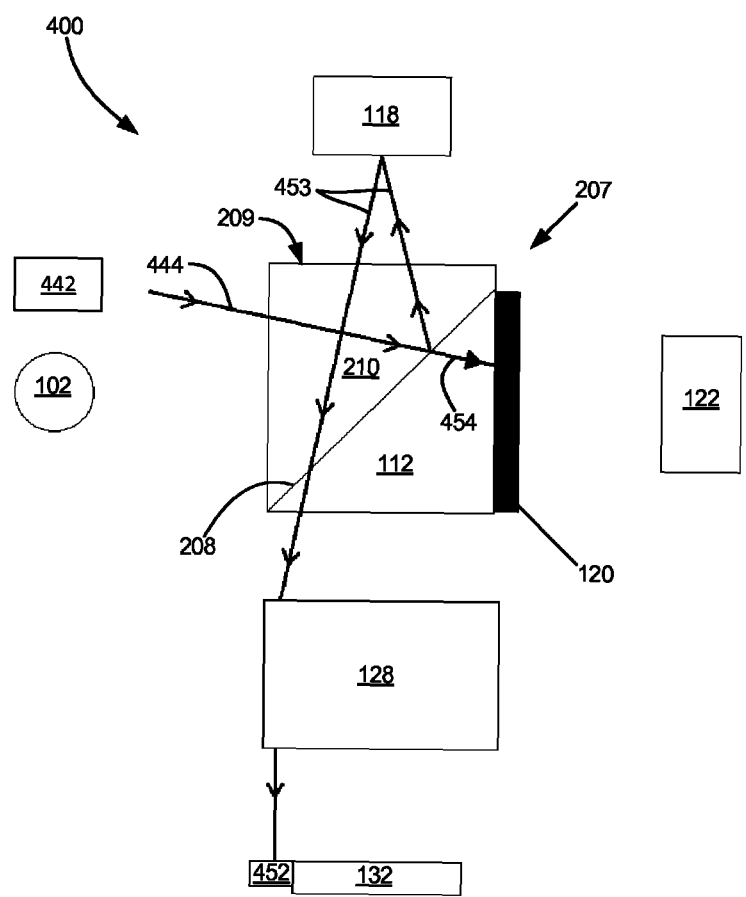
FIG. 4 illustrates a schematic diagram of an inspection system according to yet another embodiment.

FIG. 4 illustrates a schematic diagram of an inspection system 400 according to yet another embodiment. Inspection system 400 is similar to inspection system 200, but includes the added functionality of a confocal autofocus feature for monitoring or determining focus. Confocal beam 444 is emitted or illuminated from at least one optical light source 102 or as illustrated in FIG. 4 from optical light source 442. Confocal beam 444 includes a third wavelength of light.

Confocal beam 444 enters beam splitter 209 and splits at beam splitter surface 208 into a first portion 453 and a second portion 454. First portion 453 passes through or is directed through right angle prism 210 and reflects off test surface 118 at an angle. Second portion 454 passes through or is directed through right angle prism 112 and is absorbed by wavelength-specific or color specific light absorbing filter 120. For second portion 454 of confocal beam 444 to be absorbed by wavelength-specific light absorbing filter 120, the third wavelength of light of confocal beam 444 must be different from the first wavelength of light to prevent unwanted interference between portions 453 and 454, which would otherwise cause an erratic signal at or near focus. However, the third wavelength of light can be same as or different from the second wavelength of light.

First portion 453 is imaged onto a sensor 452 such as a split sensor, or onto a portion of image sensor array 132 using imaging optics 128. The image position of the first portion 453 of confocal beam 444 changes as a function of distance between the test surface 118 and prism 210 and therefore can be used to monitor or determine focus quality by sensor 452 or image sensor array 132.

Figure 5:
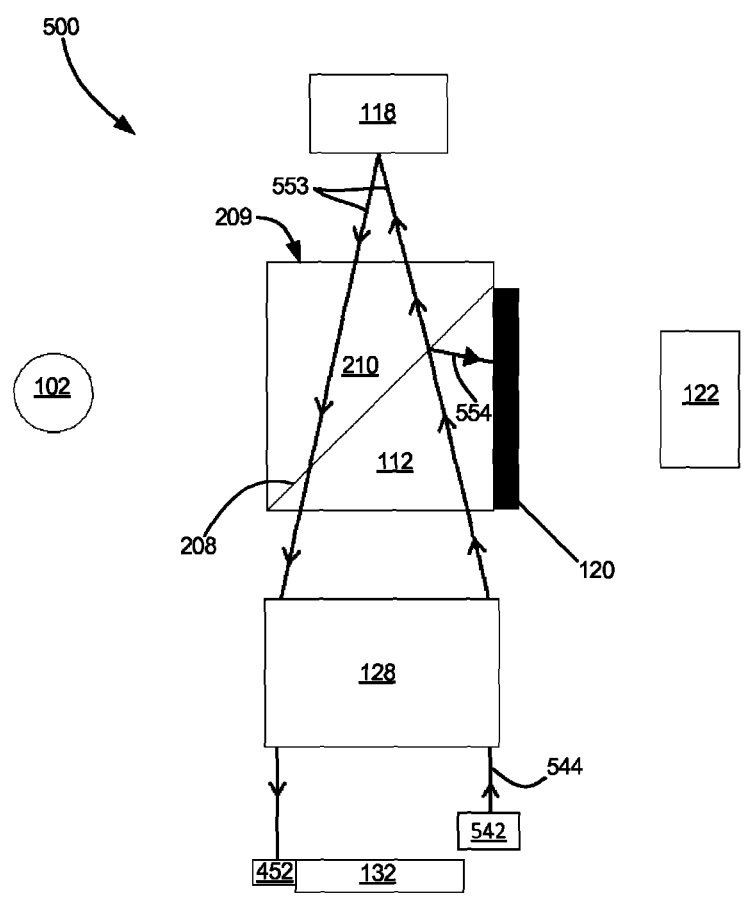
FIG. 5 illustrates a schematic diagram of an inspection system according to yet another embodiment.

FIG. 5 illustrates a schematic diagram of an inspection system 500 according to yet another embodiment. Inspection system 500 is similar to inspection system 400 except for the configuration of light source 542. As illustrated, a confocal beam 544 is emitted or illuminated from optical light source 542 and includes a third wavelength of light. More specifically, confocal beam 544 is emitted or illuminated to pass through imaging optics 128 or a portion of imaging optics 128 before passing through beam splitter 209. After exiting imaging optics 128 or a portion thereof, confocal beam 544 enters beam splitter 209 and splits at beam splitter surface 208 into a first portion 553 and a second portion 554. First portion 553 passes through or is directed through right angle prisms 210 and 112 and reflects off test surface 118 at an angle. Second portion 554 passes through or is directed through right angle prism 112 and is absorbed by wavelength-specific or color specific light absorbing filter 120. For second portion 554 of confocal beam 544 to be absorbed by wavelength-specific light absorbing filter 120, the third wavelength of light of confocal beam 544 must be different from the first wavelength of light to prevent unwanted interference between portions 553 and 554, which would otherwise cause an erratic signal at or near focus. However, the third wavelength of light can be same as or different from the second wavelength of light.

First portion 553 of confocal beam 544 is imaged onto a sensor 452 such as a split sensor, or onto a portion of image sensor array 132 using imaging optics 128. The image position of the first portion 553 of confocal beam 544 changes as a function of distance between the test surface 118 and prism 210 and therefore can be used to monitor or determine focus quality by sensor 452 or image sensor array 132.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Beside the inspection of optical components, such as fiber endfaces or fiber connector endfaces, various other ways to apply the disclosed embodiments are possible. For example, interference microscopy for light sensitive or environmentally restricted materials or biomaterials, in-situ interference microscopy where test tubes, capillary tubes or extraction is required to prepare samples for microscopy, and for interference probes, interference endoscopy, and immersion microscopy.

What is claimed is:

1. An inspection system comprising:
optical components for operating the inspection system in an interference fringe imaging mode where three-dimensional surface information is acquired by producing an interference fringe image and in a microscope imaging mode wherein two-dimensional surface information is acquired by producing a two-dimensional image;
at least one optical light source configured to emit a first color of light to operate the inspection system in the interference fringe imaging mode and configured to emit a second color of light to operate the inspection system in the microscope mode, wherein the first color of light is different from the second color of light;
a wavelength-specific light absorbing filter that absorbs substantially all light from the at least one optical light source except the first color of light so that the interference fringe image is produced with the first color of light and the two-dimensional image is produced with the second color of light; and an image sensor array that simultaneously captures the interference fringe image and the two-dimensional image for viewing in a single exposure.

2. The inspection system of claim 1, wherein the optical components comprise a beam splitter that splits the first color of light into a test beam and a reference beam at a beam splitter surface, and wherein the test beam of the first color of light travels along a test path to reflect off a test specimen and the reference beam of the first color of light travels along a reference path to reflect off of a reference surface, and wherein the test beam and the reference beam of the first color of light recombine at the beam splitter to form an interference fringe beam that is focused onto the image sensor array to produce the interference fringe image.

3. The inspection system of claim 2, wherein the beam splitter further splits the second color of light into a test beam and a reference beam at the beam splitter surface, and wherein the test beam of the second color of light travels along the test path to reflect off the test specimen and the reference beam of the second color of light travels along the reference path and is absorbed by a wavelength-specific light absorbing filter, and wherein the test beam of the second wavelength of light is focused on the image sensor array to produce the two-dimensional image.

4. The inspection system of claim 3, wherein the first color of light is emitted from the at least one optical source in concurrence with the second color of light.

5. The inspection system of claim 3, wherein the optical components comprise an optical path length (OPL) compensation plate that intersects the test path and is coupled to the beam splitter.

6. The inspection system of claim 3, wherein the wavelength-specific light absorbing filter intersects the reference path and is interposed between the beam splitter and the reference surface.

7. The inspection system of claim 6, wherein the image sensor array comprises a color image sensor array.

8. The inspection system of claim 1, wherein the at least one optical light source is further configured to emit a third color of light to monitor or determine focus, wherein the third color of light is different from the first color of light.

9. The inspection system of claim 8, wherein the third color of light can be the same as or different from the second wavelength color of light.

10. An inspection system comprising:
at least one optical light source for illuminating at least two different colors of light;
a beam splitter including a beam splitter surface that splits the first color of light into a test beam and a reference beam at the beam splitter surface and splits the second color of light into a test beam and a reference beam at the beam splitter surface, wherein the test beam of the first color of light is directed in a first direction along a test path to a test specimen and the reference beam of the first color of light is directed in a second direction along a reference path to a reference surface, and wherein the test beam of the second color of light is directed in the first direction along the test path to the test specimen and the reference beam of the second color of light is directed along the reference path in the second direction, the first direction being different from the second direction; and
a wavelength-specific light absorbing filter intersecting the reference path and being interposed between the beam splitter and the reference surface, wherein the wavelength-specific light absorbing filter absorbs substantially all light in the reference beam from the at least one optical light source except the first color of light, which is allowed to pass to the reference surface;
wherein the test beam of the first color of light reflects off the test specimen and is directed in a second direction along the test path opposite from the first direction of the first color of light along the test path and the reference beam of the first color of light reflects off the reference surface and is directed in a second direction along the reference path opposite from the first direction of the first color of light along the reference path to interfere to form a two-beam interference fringe pattern that is focused on an image sensor using imaging optics; and
wherein the test beam of the second color of light reflects off the test specimen and is directed in a second direction along the test path opposite from the first direction of the second wavelength of light along the test path to be focused on the image sensor using the imaging optics.

11. The inspection system of claim 10, wherein the beam splitter comprises a first right angle prism coupled to a second right angle prism at their hypotenuse surfaces, and wherein a hypotenuse surface of the first right angle prism couples to a hypotenuse surface of the second right angle prism and comprises the beam splitter surface.

12. The inspection system of claim 11, wherein the wavelength-specific light absorbing filter is attached to a leg of one of the first or second right angle prisms.

13. The inspection system of claim 10, wherein the beam splitter comprises a beam splitter plate, and wherein the beam splitter surface comprises is an outer surface of the beam splitter plate.

14. The inspection system of claim 13, wherein the wavelength-specific light absorbing filter is located a spaced distance from the beam splitter plate and a spaced distance from the reference surface.

15. The inspection system of claim 10, wherein the at least one optical light source further illuminates a third color of light, wherein the third color of light is different than the first color of light.

16. The inspection system of claim 10, wherein the first color of light is emitted from the at least one optical source in concurrence with the second color of light so that the two-beam interference fringe pattern of the first color of light and the test beam of the second color of light are simultaneously focused on the image sensor and simultaneously captured by the image sensor.

17. The inspection system of claim 10, wherein the first color of light and the second color of light are emitted asynchronously so that the two-beam interference fringe pattern of the first color of light and the test beam of the second color of light are separately focused on the image sensor and separately captured by the image sensor.

18. A method of inspecting an optical specimen comprising:
emitting a first color of light from at least one optical light source to operate an inspection system in an interference fringe imaging mode where three-dimensional surface information is acquired by splitting the first color of light into a first portion and a second portion and producing an interference fringe image after the first portion and the second portion of the first color of light interfere;
emitting a second color of light with the first color of light from the at least one optical light source to operate the inspection system in a microscope mode where two-dimensional surface information is acquired by producing a two-dimensional image using only a first portion of the second color of light, the second color of light being different from the first color of light;
using a wavelength-specific filter to filter out substantially all light except for the second portion of the first color of light so that the second portion of the first color of light is allowed to interfere with the first portion of the first color of light and the second portion of the second color of light is not allowed to interfere with the first portion of the second color of light; and capturing the interference fringe image and the two-dimensional image for viewing in a single exposure.

19. The method of claim 18, wherein the first portion of the first color of light comprises a test beam and the second portion of the first color of light comprises a reference beam, and wherein the test beam of the first color of light travels along a test path to reflect off the optical specimen and the reference beam of the first color of light travels along a reference path to reflect off of a reference surface, and wherein the test beam and the reference beam of the first color of light interfere to form an interference fringe beam that is focused onto an image sensor array to capture the interference fringe image, wherein the first color of light is split at a beam splitter surface to form the test beam and the reference beam.

20. The method of claim 19, wherein the first portion of the second color of light comprises a test beam and the second portion of the second color of light comprises a reference beam, and wherein the test beam of the second color of light travels along the test path to reflect off the optical specimen and the reference beam of the second wavelength color of light travels along the reference path to be absorbed by a wavelength-specific light absorbing filter, and wherein the test beam of the second color of light is focused on the image sensor array to capture the two-dimensional image.

\* \* \* \* \*

UNITED STATES PATENT AND TRADEMARK OFFICE
CERTIFICATE OF CORRECTION

PATENT NO. : 9,007,572 B2
APPLICATION NO. : 13/800539
DATED : April 14, 2015
INVENTOR(S) : Ryan Elliot Eckman et al.

It is certified that error appears in the above-identified patent and that said Letters Patent is hereby corrected as shown below:

In the Claims

Col. 7 Claim 9, line 43: delete "wavelength"

Col. 8 Claim 13, line 26: delete "comprises"

Col. 9 Claim 20, line 21: delete "wavelength"

Signed and Sealed this
First Day of September, 2015

Michelle K. Lee
*Director of the United States Patent and Trademark Office*